United States Patent [19]

Wisniak

[11] Patent Number: 4,587,107
[45] Date of Patent: May 6, 1986

[54] EXTRACTANT COMPOSITIONS CONTAINING DIALKYL AND DIARYL PHOSPHONATE DERIVATIVES AND METHODS FOR THE USE THEREOF

[75] Inventor: Jaime Wisniak, Beer-Sheva, Israel

[73] Assignee: Negev Jojoba, Tel Aviv, Israel

[21] Appl. No.: 534,281

[22] Filed: Sep. 21, 1983

[30] Foreign Application Priority Data

Dec. 3, 1982 [IL] Israel .......................................... 67404

[51] Int. Cl.$^4$ .............................................. C01G 43/00
[52] U.S. Cl. .......................................... 423/10; 423/8; 252/48.6
[58] Field of Search ........................ 423/8, 10; 252/48.6

[56] References Cited

U.S. PATENT DOCUMENTS

| | | | |
|---|---|---|---|
| 2,812,233 | 11/1957 | Lewis et al. | 423/10 |
| 2,902,454 | 9/1959 | Moore | 423/10 |
| 3,052,514 | 9/1962 | Schmitt | 423/10 |
| 3,214,239 | 10/1965 | Hazen et al. | 423/10 |
| 3,378,352 | 4/1968 | Hansen | 423/10 |
| 3,873,457 | 3/1975 | Magne et al. | 252/48.6 |
| 3,993,728 | 11/1976 | Schulz | 423/10 |
| 4,130,495 | 12/1978 | Wisniak et al. | 252/48.4 |
| 4,243,637 | 1/1981 | Bradford et al. | 423/10 |

FOREIGN PATENT DOCUMENTS 55552 8/1982 Israel .

*Primary Examiner*—Edward A. Miller

[57] ABSTRACT

The invention provides an extractant composition comprising as an extraction agent the reaction product of jojoba oil and dialkyl or diaryl phosphite. The invention also provides a method for extracting actinide metal ions from an aqueous solution containing the same comprising contacting the solution with an extractant organic solution containing the above extraction agent and separating the resulting phases.

10 Claims, No Drawings

EXTRACTANT COMPOSITIONS CONTAINING DIALKYL AND DIARYL PHOSPHONATE DERIVATIVES AND METHODS FOR THE USE THEREOF

The present invention relates to extractant compositions and methods for the use thereof.

More particularly, the present invention relates to the use of dialkyl and diaryl phosphonates of jojoba oil as extraction agents especially as an extractant for actinide metals such as uranium, thorium and plutonium, etc.

Jojoba oil is composed primarily of long chain esters having $C_{20}$ and $C_{22}$ alcohols and acids each with one double bond. Thus one mole of jojoba oil can react with one or two moles of diaryl or dialkyl phosphite according to the following scheme.

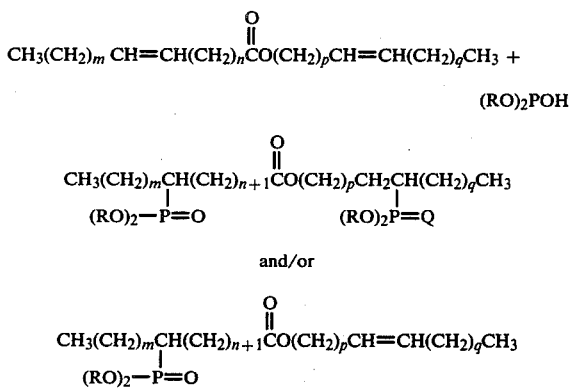

and/or $$CH_3(CH_2)_m\underset{(RO)_2-P=O}{CH(CH_2)_{n+1}}CO(CH_2)_pCH=CH(CH_2)_qCH_3$$

wherein m+n are 16 or 18, P+q are 17 or 19, an R is an alkyl group having 1 to 18 carbon atoms or an aryl group such as phenyl, tolyl, alyl etc.

The reaction is usually conducted with a catalyst. Any free radical generating catalyst or high energy radiation is satisfactory. However, organic peroxides are preferred and t-butyl perbenzoate was found to be quite satisfactory.

The compounds used in the extractant compositions of the present invention are described and claimed per se in Israel specification No. 55552 and claimed therein as lubricating oil additives.

Dialkyl alkylphosphonates in general are a group of stable organic phosphorous esters possessing unique properties. They have been recommended for use in a number of applications, as plasticizers, as synthetic lubricants, additives to improve the extreme pressure properties of lubricants, functional fluids, oil or fuel additives, deicers and pour-point depressants, pesticides, synergists or carriers for pesticides and fertilizers, intermediates for the synthesis of corrosion inhibitors, and metal extractants. Several dialkyl alkylphosphonates have been found to be useful as flame retardants, softeners, textile treating agents, and heat transfer media.

It is to be noted however that of the many different types of possible uses of alkylphosphonates in general it was believed and taught according to said patent that phosphonates of jojoba oil were best suited for use as lubricating oil additives.

It has now been surprisingly discovered that not only are dialkyl and diaryl phosphonates of jojoba oil suitable for use as extraction agents but that they exhibit superior properties as shown hereinafter when compared with tributyl phosphate, which is known as one of the leading commercial phosphate extractants.

Thus the present invention provides an extractant composition comprising as an extraction agent the reaction product of jojoba oil and a dialkyl or diaryl phosphite. Preferably, said phosphite is selected from the group consisting of dimethyl, diethyl, dibutyl, diisooctyl, distearyl and diphenyl phosphite and combinations thereof.

Said extractant composition preferably also contains an organic solvent and kerosene, toluene, chloroform and/or CCl$_4$ are preferred solvents.

The invention also provides a method for extracting actinide metal ions from an aqueous solution containing the same comprising contacting said solution with an extractant organic solution containing a dialkyl or diaryl phosphonate of jojoba oil as an extraction agent and separating the resulting phases.

Said aqueous solution is preferably acidic, which acidity also facilitates phase separation and if it is not so it is preferred to add acid to form an acidic solution having preferably less than one molar acid concentration.

The method of the present invention can also be applied to aqueous solutions of phosphoric acid containing phosphoric acid at about 5.5 to about 6.5 molar acid concentration to extract uranyl ions present in said solution.

It has further been found that addition of salts, such as sodium nitrate, sodium perchlorate, sodium phosphate, potassium sulfate and ammonium chloride or any other salt, whose anions do not form insoluble compounds or strong complexes with the metal ion being extracted, to the aqueous solution increase the extraction coefficient and thus, it is also preferred to provide said aqueous solutions with salts containing anions selected from the group consisting of nitrate, perchlorate, sulfate, chloride and phosphate to enhance the extraction effect of the extractants according to the present invention.

As is known, in an extraction process a given material transfers from one liquid phase to another liquid phase. Usually one of the phases is an aqueous one. The extracting solvent may react with the extracted species through a solution chelation, ion pairing, ion exchange, and other processes. The extracting material is usually dissolved in an additional solvent (diluent) in order to modify appropriately its physical properties (density, viscosity, etc.). The diluent does not necessarily have extracting properties.

Many organic materials are known to form chelates that tend to dissolve in an organic medium. In these systems the organic material behaves usually as a weak acid that contains a donor group that generates a bidentate chelate with the extractable metal.

Organophosphorus compounds of an acid nature will extract metals by a cation exchange reaction between hydrogen ions of the extractant and the metal cation extracted. In general, the extracting power for a metal cation increases with the metal ion charge and for groups having the same charge, the extracting power decreases with the radius of the ion.

The reaction between metal ions and dialkyl phosphites can be explained on the basis of the tendency of the latter to dimerize.

Extensive studies on the extraction of hexavalent uranium, U(VI), from highly acidic solutions like those present in the Oron Works were conducted as was the separation of U(VI) from thorium(IV) or plutonium-(IV). Straight extraction of U(VI) was tested at U concentration of 0.1 molar and 0.001 molar, in phosphoric acid medium up to 6 molar.

Said studies as described in the examples hereinafter show the surprising effectiveness of the extraction agents of the present invention. Thus, e.g., at a maximum concentration for thorium extraction, approximately 0.0004 molar, there is a difference of approximately 500 in the extraction constants for thorium and uranium. This provides excellent separation of Th(IV) from U(VI).

Before describing the method of the present invention the preparation of the dialkyl and diaryl phosphonates of jojoba oil used in the present invention will be briefly described.

Reactions between jojoba oil and diaryl dialkylphosphites were conducted in a one-liter double-walled resin flask provided with a variable speed agitator, thermometer, and condenser refrigerated to below 0° C.

Dialkyl and diaryl phosphites were obtained from Borg-Warner Corporation, Parkersburg, W. Va., t-butyl-perbenzoate was purchased from Merck.

Jojoba oil and the respective dialkyl and diaryl phosphites were heated under agitation and nitrogen gas blanket to the desired temperature and t-butylperbenzoate was added at specified times to catalyse the reaction. Samples were taken and analysed for phosphite content by addition of MaCH and back-titration with HCl.

| Range of Variables | |
|---|---|
| Temperature: | 100–180° C. |
| Jojoba/phosphite: | 1.1 to 1.6, molar basis |
| t-butylperbenzoate: | 1–15% of phosphite, molar basis |
| solvent: | None or toluene |
| Alkyl and uryl groups: | Methyl, ethyl, butyl, isootyl, phenyl, stearyl |

In said reactions it was found that (a) To achieve total conversion a ratio of jojoba/-phosphite of at least 1:4 should be used, that is to say, a 100% excess of phosphite.

(b) Temperature of reaction is limited by the half-life of the radical initiator. It is not possible to work at temperatures above 150° C. because the t-butylperbenzoate will decompose at a much faster rate than the rate of propagation of the chain reaction. An increase in temperature strongly increases the rate. For example, for jojoba/dibutyl phosphite=1.5, 7% t-butylperbenzoate, increasing the temperature from 110° C. to 150° C. decreases the time for full conversion from 8 h to 20 minutes.

(c) Jojoba and dimethyl phosphite are highly insoluble and the reaction has to be carried in the presence of a solvent, e.g., toluene. It has been found that high conversion is achieved without solvent if the oil is kept hot and the required solution of dimethyl phosphite and t-butylperbenzoate are added dropwise over a 2 h period. This method eliminates the need of a solvent and the use of excess phosphite.

While the invention will now be described in connection with certain preferred embodiments in the following examples, it will be understood that it is not intended to limit the invention to these particular embodiments. On the contrary, it is intended to cover all alternatives, modifications and equivalents as may be included within the scope of the invention as defined by the appended claims. Thus, the following examples which include preferred embodiments will serve to illustrate the practice of this invention, it being understood that the particulars described are by way of example and for purposes of illustrative discussion of preferred embodiments of the present invention only and are presented in the cause of providing what is believed to the most useful and readily understood description of procedures as well as of the principles and conceptual aspects of the invention.

EXAMPLE 1

Standard techniques of solvent extraction were followed using trace level concentrations of $^{233}$U (as $UO_2^{+2}$), $^{230}$Th (as $Th^{+4}$), $^{241}$Am (as $Am^{+3}$) and $^{239}$Pu (as $Pu^{+4}$). These radionuclides were counted for alpha decay in a liquid scintillation counter using a counting cocktail (10 ml dioxane solution of 0.5 g naphthalene, 0.07 g PPO) in which 0.5 to 1.0 ml of either the organic or the aqueous phase of the solvent extraction mixture was dissolved.

To study the extraction dependency on the jojoba oil concentration, solutions of the diethyl phosphonate of jojoba oil in toluene and, in later experiments, in kerosene were prepared. Their concentrations varied from $5 \times 10^{-5}$M to $1 \times 10^{-1}$M and preferably the concentration of the extraction agent is between about $1 \times 10^{-3}$ and $5 \times 10^{-5}$M. Three ml of these solutions were placed in a small vial to which 3 ml of aqueous 3.1 M $HNO_3$ were also added (the aqueous phase had the tracer added prior to its addition to the vial). The vials were placed in a thermostated water bath (25°±0.1° C.) and subjected to mild shaking overnight. After centrifugation of the vials, 0.5 to 1.0 ml aliquots were withdrawn from each phase to be added to the scintillation counting cocktail. The counting data were used to calculate the distribution co-efficient D (= cpm organic phase/cpm aqueous phase).

To study the extraction dependency on nitric acid concentration, the same procedure was followed. Three ml aliquots of varying $HNO_3$ concentrations (0.10–8.0M) containing the actinide tracer were mixed with an organic phase—either toluene or kerosene solute—of fixed oil concentration—usually $1.0 \times 10^{-3}$M.

A solution of the dimethyl phosphonate of jojoba oil was titrated with a solution of $NaOCH_3$. One ionizable hydrogen was measured and the equivalent weight of this oil was calculated to be ca. 700. This is understandable if the oil is only 50% phosphonated and that phosphonate group is monomethylated (i.e. the active site is $PO_2(CH_3)OH$).

It was found that the dependency of log D on log [oil] is ca. +1 indicating 1 molecule of oil per cation is the stoichiometry of the extracting species for $Am^{+3}$ and $UO_2^{+2}$. The extraction of $Th^{+4}$ and $Pu^{+4}$ is so great under these conditions (~100%) that it was not possible to define a dependency on the oil concentration. However, the $Th^{+4}$ data suggest it is +1 also. It was thus concluded that for the actinide elements in oxidation states III, IV and VI, extraction occurs with a metal:oil ratio of 1:1. Studies with the "dibutyl" and "dimethyl" derivatives also show a 1:1 extraction stiochiometry.

EXAMPLE 2

The extraction with variable H+ concentration but constant $NO_3$—concentration by using solutions of 8 M nitrate with $xMH^+$ and $(8-x)MLi^+$ were studied. In these studies the extraction of $Am^{+3}$ and $Pu^{+4}$ showed uncertain but possibly slight negative dependence on H+ while the $UO_2^{+2}$ dependence was ca. $-1$. In the lower range of extracting agent concentration, no H ion dependency was found for any of the cations.

The results of the measurements of extraction dependency on $HNO_3$ and $(H+Li)NO_3$ concentration is most simply interpreted as reflecting competition between increasing extraction of $Am(NO_3)_n$ (J) complexes with increasing $NO_3-$ and decreasing extraction due to a decreasing [J] concentration with increasing [$HNO_3$]. This latter is possibly a result of formation of $HNO_3.J$ complexes which is known to occur with Tributyl phosphate (TBP). Also by analogy to HX-TBP formation (HX=mineral acids) and the trends in log D as a function of log HX for TBP extractions, there was derived the following, relative degree of complexations: $HNO_3.J > HCl.J > HClO_4.J$. In summary the extracted species is most likely $M(NO_3)_n.J$ where M=Actinides of III, IV and VI oxidation states and n—valency of cation species.

These results can be used to calculate separation factors. The D values are listed in Table 1 with comparable TBP values. Table II shows the separation values compared to those for TBP. The data in the tables is for 4M$HNO_3$ (Purex process concentration) and the diethylphosphonate of jojoba oil at $10^{-3}$M concentration in kerosene. The TBP data is for a 19% concentration in kerosene. The separation factors indicate that the jojoba derivative of the present invention is a much more effective extraction agent. $Pu^{+4}$ can be separated very cleanly from $UO_2^{+2}$ under these conditions while the purification of both $UO_2^{+2}$ and $Pu^{+4}$ from trivalent lanthanide fission products and from $Am^{+3}$ is very satisfactory.

TABLE 1

Values of Extraction Coefficients for
4.0 M $HNO_3$/$10^{-3}$M Jojoba or 19% TBP

| Cation | D | |
|---|---|---|
| | Jojoba | TBP |
| $Am^{+3}$ | $4 \times 10^{-3}$ | 0.2 |
| $UO_2^{+2}$ | 2.2 | 30 |
| $Th^{+4}$ | 250 | 1.9 |
| $Pu^{+4}$ | 900 | 12 |

TABLE II

Separation Factors for Jojoba and TBP Extraction

| Cations | Separation Factor | |
|---|---|---|
| | Jojoba | TBP |
| $Pu^{+4}/UO_2^{+2}$ | 400 | 0.4 |
| $Pu^{+4}/Am^{+3}$ | $2.3 \times 10^5$ | 60 |
| $UO_2^{+2}/Am^3$ | 550 | 150 |

EXAMPLE 3

Solutions of uranyl ion, concentration 0.1 molar, were prepared from uranyl nitrate and various dialkyl jojoba phosphonates were used.

Concentration of uranium in all of the experiments was determined by spectrophotometric analysis, using a Varian 635$^D$ apparatus, provided with glass cells of 10 mm Thickness. All measurements were performed at room temperature.

A second series of runs were performed using solutions containing 0.001 molar uranyl ion in 6 molar phosphoric acid. For this low concentration the direct spectrophotometric method of analysis is not sufficiently sensitive; the uranyl ion was determined by complexometry, using Arsenazo III.

Every extraction system was composed of a series of measuring flasks that were filled with defined volumes of aqueous uranyl nitrate (or uranyl nitrate in 6M phosphoric acid), and the appropriate dialkyl jojoba phosphonate, with or without addition of acids, salting agents, etc. The system was agitated and after an appropriate time, agitation was stopped, the phases separate well and analyzed accordingly for U (VI) content.

Whenever necessary, phase separation was accelerated and improved by centrifugation of the sample.

For uranium extraction from acid medium at a U(VI) concentration of 0.1 molar, the distribution coefficient was measured for jojoba dimethylphosphonate (DMJ) and jojoba diethylphosphonate (DEJ) in acids like $H_3PO_4$, HCl, $HNO_3$ and $HClO_4$ (from 0 to 8 molar). The highest extraction coefficient for DMJ and DEJ was 16.2 and 42 respectively. Addition of salts like sodium nitrate provoked synergism and increased the extraction coefficient to 60 (DMJ).

It was found in general that extraction increased with decreased acid concentration, the best extraction occurring in a phosphoric acid medium. The best distribution coefficients, D, defined as $$D = (UO_2^{2+})\ org/(UO_2^{2+})\ aq$$

were, as stated hereinbefore, 41 and 16.2, for jojoba diethyl phosphonate (abbrev. DEJP) and jojoba dimethylphosphonate (abbrev. DMJP), for the same acid concentration (0.05 molar).

Two fold increase in the ratio DMPJ/U(VI) resulted in an increase of D from 16.2 to 59, with $H_3PO_4$ as the acid medium, and from 10.3 to 18.7 when the acid was $HNO_3$.

The distribution coefficient markedly depends on the nature of the diluent, kerosene and $CCl_4$ were found to be the best ones for DEPJ and DMJP respectively. There is a linear correlation between organic media concentration and D. The plot of log D against (DXPJ) (concentration of the diphosphonate) yields straight lines with different slopes for each solvent.

For DMPJ the slope of the line is 1.25 with $CCl_4$ and 1.50 for either kerosene or methylene chloride. For DEPJ the slope is 1.56 for either $CCl_4$ or methylene chloride, for kerosene it is 1.42.

Many solvents were tested: Benzene, toluene, ethanol, methanol, acetone, n-butanol, tetrahydrofuran, diethyl ether, chloroform, carbon tetrachloride, cyclohexanol, etc. The best ones were found to be chloroform and carbon tetrachloride.

In all the systems investigated a third intermediate phase is present, this third phase tends to disappear with an increase in acid concentration. The experiments showed that when using $CHCl_3$ as the diluent the third-phase problem is non-existent. On the basis of all the above information chloroform was selected as the preferred diluent although other diluents are also utilizable.

EXAMPLE 4

Extraction of $UO_2^{2+}$ with DEPJ in chloroform. A series of experiments shows that the distribution coefficients for DEPJ are higher than those of DMPJ. This is illustrated in the following table, Table 3. Distribution coefficients of $UO_2^{2+}$ with DEPJ at the acid concentration that gives D maximum.

TABLE 3

| | Comparison with DMPJ | | |
|---|---|---|---|
| Acid | Conc. for Maximum D | D max DEPJ | D max DMPJ |
| $H_3PO_4$ | 0.05 | 41 | 16.2 |
| $HNO_3$ | 0.05 | 15 | 10.3 |
| HCl | 0.05 | 12.1 | 9.5 |
| $HClO_4$ | 0.05 | 13.5 | 13.5 |

Table 3 shows that $H_3PO_4$ has the strongest influence of all acids.

EXAMPLE 5

Influence of $DMPJ/VO_2^{2+}$ ratio, with $H_3PO_4$ or $HNO_3$. A series of experiments showed that an increase in the ratio increases significantly the distribution coefficient. Table 4 illustrates this point.

TABLE 4

Influence of ratio $DMPJ/UO_2^{2+}$ on distribution coefficient.

| | Ratio | |
|---|---|---|
| Acid | 1 | 2 |
| $H_3PO_4$ | 16.2 | 59 |
| $HNO_3$ | 10.3 | 18.7 |

Again $H_3PO_4$ is a more powerful acid than $HNO_3$.

EXAMPLE 6

In experiments on uranium cation extraction from 6 molar $H_3PO_4$ solution with 0.001 molar concentration of U(VI) four extractants (dimethyl, diethyl, dibutyl, diisooctyl) were tested at concentrations varying from 0.05 to 0.5 molar, in solvents like carbon tetrachloride, methylene chloride and kerosene.

The extraction coefficient was found to increase linearly with concentration of the phosphonate and to vary with its nature as follows Methyl > ethyl > butyl > isooctyl For example, with DMJ 0.5 molar the value of the extraction coefficient is 5, while for diisooctyl it is about 1.2.

While particular embodiments of the invention have been described, it will be evident to those skilled in the art that the present invention may be embodied in other specific forms without departing from the essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A method for extracting actinide metal ions from an aqueous solution containing the same comprising contacting said solution with an extractant organic solution comprising, as an extraction agent, the reaction product of jojoba oil and dialkyl or diaryl phosphite, and separating the resulting phases.

2. A method according to claim 1, wherein said aqueous solution is acidic.

3. A method according to claim 1, wherein said aqueous solution contains phosphoric acid.

4. A method according to claim 1, wherein said aqueous solution contains nitric acid.

5. A method according to claim 2, wherein said acidic solution has less than one molar acid concentration.

6. A method according to claim 1, wherein said aqueous solution contains phosphoric acid being present at about 5.5 to about 6.5 molar acid concentration.

7. A method according to claim 1 wherein said aqueous solution is provided with anions selected from the group consisting of nitrate , perchlorate, sulfate, chloride and phosphate.

8. A method according to claim 1, wherein said actinide metal ions are uranium ions.

9. A method according to claim 1, wherein said actinide metal ions are plutonium ions.

10. A method according to claim 1, wherein said actinide metal ions are thorium ions.

* * * * *